3,523,986
AQUEOUS SUSPENSION POLYMERIZATION PROCESS AND SYSTEMS FOR PREPARATION OF BLOTTER-TYPE VINYL CHLORIDE RESINS
Robert E. Bingham, Cuyahoga Falls, Ohio, assignor to The General Tire & Rubber Company, a corporation of Ohio
No Drawing. Filed Mar. 18, 1968, Ser. No. 714,102
Int. Cl. C08f $1/11, 3/30$
U.S. Cl. 260—92.8          8 Claims

ABSTRACT OF THE DISCLOSURE

Blotter-type vinyl halide resins that have a low bulky density, i.e., between about 0.30 to 0.45 g./cc., high capacity to absorb plasticizer, and require minimal power to form homogeneous mixtures with plasticizer, are made by suspension polymerizations, in which the aqueous suspension system has a pH of 2–6 and contains lithium ions and anionic emulsifier. The resulting resins may be used to form rigid impact plastics or flexible products including sheets, coatings and molded articles.

BACKGROUND OF THE INVENTION

The so-called "blotter-type" vinyl halide resins are a commercially important class of thermoplastic materials generally used in combination with plasticizers to form compositions which can be used for calendering, coating or extruding. Such resins derive their characteristic name because of their capacity to absorb relatively large amounts of plasticizer, e.g., dioctyl phthalate (DOP). This class of vinyl halide resin is generally prepared by polymerization of vinyl halide monomer or mixture with other copolymerizable materials in the presence of an aqueous system containing emulsifying agents, protective colloids, or the like in which the polymerizable monomer is suspended (see U.S. 3,053,801 and 3,062,759). The suspension polymerizations produce polymers in the granular form, which separate from the aqueous suspension system in contrast to so-called polymerizations in which stable emulsions of polymers of colloidal size particles are produced.

The blotter-type resins may be compounded with plasticizer by two different types of operations which are referred to in the plastics industry as cold, dry blending and hot, dry blending. Regardless of which of these two general methods are used to mix plasticizer with the vinyl halide resin, an important property of the resin is the time and horsepower (energy) which is required to mix the resin with the plasticizer. In cold, dry blending which is performed at ambient temperatures (about 15–25° C.) the curve representing mixing energy as a function of time is generally somewhat flat, horizontal line. At the end of cold, dry blending, the polymer appears to be a dry granular product. Although it may feel wet, it flows like a powder. However, very little if any, of the plasticizer is internally held in the resin particles. Rather, it is retained on the surface of the particles or in the interstices or capillary passages between the particles.

In hot, dry blending, which is conducted at temperatures of about 85–90° C., the energy curve rises steeply after a few minutes and then levels out at the end of the mixing cycle to about the same level shown at the beginning of the mixing cycle. With this type of blending, most if not all of the plasticizer is in the polymer particles at the end of the mixing and very little is on the outside surface or in the interstices of the polymer particles. The resulting mix is free-flowing and dry to the touch.

In the blotter-type vinyl halide resins, in addition to mixing qualities, bulk density of the product is also an important factor. This in turn is somewhat dependent upon whether the resin is a low, intermediate, or high conversion polymer. Low conversion polymers are those made by polymerizing less than about 50% of the polymerizable monomer charge used in the aqueous suspension polymerization. Intermediate conversion polymers are those in which 50 to 70% of the polymer charge is converted in the polymer. High conversion resins are those formed by polymerization of 70% or more of the polymerizable monomer charge. Normally, the blotter-type resins made by the suspension polymerizations exhibit higher bulk densities with higher percentage conversions. Lower conversion polymers are generally not made due to the economics of running polymerization reactors. Conventional intermediate conversion polymers have a bulk density of about 0.5 g./cc.

It is known in the art of polymerization of vinyl halide monomers or monomer mixtures to employ various metal salts or soaps as emulsifiers in aqueous polymerization systems (see U.S. 3,167,533 and 3,196,134). It is also known to utilize metal oxides or hydroxides to control grain size of polymers produced in the polymerizations (see U.S. 3,151,103).

Notwithstanding the fact that suspension polymerization techniques have reached a high state of development (see U.S. 3,042,665), the plastics industry is in need of blotter-type vinyl halide resins which exhibit improved cold and hot, dry blending properties. Furthermore, there is a need for improved polymerization techniques which will produce blotter-type resins in a narrow and more controlled particle size range, shape and distribution and will have low bulky density relative to the degree of conversion of the polymer.

OBJECTS

A principal object of this invention is the provision of improved methods for the production of blotter-type vinyl halide resins that have a low bulk density, a high capacity to absorb plasticizer, and require a minimum amount of energy to form homogeneous mixtures with plasticizer either by cold, dry blending or hot, dry blending.

Further objects include the provision of:

(1) New polymerization systems for the aqueous suspension polymerization of vinyl halide monomer or monomer mixtures to produce a blotter-type resin of bulk density of about 0.30 to 0.45 g./cc.

(2) New methods for the production of blotter-type vinyl chloride resin having good cold, dry blending properties due to particle size, shape and distribution in conjunction with low bulk density.

(3) New types of aqueous systems in which to conduct suspension polymerization of vinyl halide monomers to form blotter-type resins of intermediate or high conversion type having a bulk density of about 0.3 to 0.45 g./cc.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

The foregoing objects are accomplished in accordance with the present invention with the production of blotter-type resins of vinyl halide by aqueous suspension polymerization of polymerizable monomer comprising predominantly vinyl halide using an aqueous suspension system, in which the polymerizable monomer is polymerized, that contains lithium ions plus anionic emulsifier and has a pH of about 2 to 6. Advantageously, the weight ratio of the aqueous suspension system to polymerizable monomer in contact with the system is between about 1.25:1 and 4:1 and the polymerization is conducted at a temperature between 40 and 70° C., preferably between 44 and 65° C.

Lithium ions are advantageously supplied by water soluble salts which are dissolved as such in the aqueous suspension system or formed in situ by reaction of a lithium compound with an acid. The lithium ions may be derived, for example, from lithium hydroxide, which is reacted with a mineral acid, such as phosphoric acid or hydrochloric acid, added to the aqueous system in order to adjust the pH of the system to the desired value between 2 and 6.

As the anionic emulsifier, one may advantageously use alkali metal salts of alkyl sulfates or alkaryl sulfonates, although a variety of other anionic emulsifiers may be used such as disclosed in U.S. 3,042,665.

In addition to the lithium ions and anionic emulsifier, the aqueous suspension system advantageously will comprise a water-soluble suspending agent or protective colloid, specifically, methyl cellulose or an equivalent cellulose derivative.

The objects are further accomplished by use of new polymerization systems for the production of blotter-type resins of vinyl chloride to give a resin product having a bulk density of about 0.30 to 0.45 g./cc. having a high capacity for absorbing plasticizers, the polymerization system consisting essentially of polymerizable monomer comprising predominantly vinyl chloride and an aqueous suspension system having a pH of between 2 and 6 comprising water, dissolved lithium salt, and anionic emulsifier. A preferred polymerization system will consist essentially of the following components in the parts by weights specified.

| Component: | Parts by weight |
|---|---|
| Polymerizable monomer | 100 |
| Water | 125–400 |
| Lithium salt | 0.01–0.10 |
| Anionic emulsifier | 0.01–0.10 |
| Cellulosic suspending agent | 0.03–0.30 |
| Polymerization catalyst | 0.01–1.0 |

DESCRIPTION OF PREFERRED EMBODIMENTS

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1

Suspension polymerizations of vinyl chloride were conducted using an aqueous suspension system of pH 3.0 containing lithium ions, an anionic emulsifier, and a water-soluble cellulosic suspension agent. The polymerizations were conducted by charging a pressure reactor with the following ingredients in the parts indicated:

| Ingredients: | Parts |
|---|---|
| Vinyl chloride | 100 |
| Water (deionized) | 300 |
| Lithium hydroxide (LiOH·H$_2$O) | 0.04 |
| Sodium lauryl sulfate | 0.04 |
| Methyl cellulose (MC-100) | 0.06 |
| $\alpha,\alpha'$-Azobisisobutylronitrile | 0.13 |
| Stearic acid | 0.5 |

Sufficient phosphoric acid was added to reduce the pH of the system to 3.0

The polymerization was conducted with the system mildly agitated at a temperature of 55° C. and a pressure of about 113 p.s.i.g. until the desired degree of conversion had been attained at which time the vessel and contents were cooled to ambient temperature (25° C.) producing a simultaneous pressure drop of about 65 p.s.i.g. Then, the unused vinyl chloride was slowly released from the reaction vessel to prevent exploding the resin particles and to maintain their generally spherical shape. A blotter-type resin was recovered from the slurry. The statistics on the polymerizations are given in Table I along with similar data concerning a conventional blotter-type resin prepared according to the general procedure of Example 1 of U.S. 3,062,759 (designated "Control").

TABLE I

|  | Batch A | Batch B | Control |
|---|---|---|---|
| Percent conversion | 67 | 55 | 50 |
| Intrinsic viscosity (dl./g.) | 1.05 | 1.01 | 1.03 |
| Bulk density (g./cc.) | 0.37 | 0.36 | 0.35 |
| Irreversible PTU (g. dop 1/100 g. PVC) [1] | 47 | 52 | 64 |
| Dry blend time in minutes [2] | 3.4 | 2.4 | 4.1 |
| Wet sieve analysis: |  |  |  |
| Percent on 50 | 2 | 4 | 0 |
| Percent on 70 | 18 | 28 | 0 |
| Percent on 100 | 58 | 43 | 3 |
| Percent on 140 | 16 | 16 | 27 |
| Percent on 170 | 4 | 3 | 20 |
| Percent on 200 | 2 | 2 | 17 |
| Percent past 200 | 0 | 4 | 33 |

[1] Dioctyl phthalate.
[2] Brabender.

Both batches A and B exhibit superior heat (press) stability to the conventional resin. These data show that the new blotter-type polymers contain a controlled close distribution of particle size with very few undesirable small particles. Attempts to reduce the fines in the production of the prior art resins by alteration of the concentrations of suspension agents, emulsifier, etc., have been unsuccessful.

The stearic acid used as an ingredient in this example does not affect the particle size or the polymerization but is included to improve the extrusion properties of the resulting resin. The lower values for the dry blend time on the new resins show substantial improvement in this quality of the products as compared with the control.

Example 2

Suspension polymerizations of vinyl chloride with high conversion were performed in a pressure vessel equipped with a marine-type impeller. The polymerizations were conducted at 55° C. and an agitator speed of 500 r.p.m. The pressure in the reactor is equal to the vapor pressure VCl at 55° C. The polymerizations were continued in each case until the desired percentage conversion had been attained and then the unused vinyl chloride was bled from the reactor. The reaction mixture was then cooled to ambient temperature and the resin recovered from the slurry.

The standard reaction mixture charged into the pressure vessel to begin each polymerization consisted of the following ingredients in the parts indicated:

| Ingredients: | Parts |
| --- | --- |
| Vinyl chloride | 100 |
| Water (deionized) | 300 |
| Methyl cellulose (MC–100) | X |
| Sodium lauryl sulfate | Y |
| Lithium hydroxide (LiOH·H$_2$O) | Z |
| α,α′-Azobisisobutyronitrile | 0.10 |

The parts "X," "Y," and "Z" for some of the above ingredients are as listed in Table II.

In each polymerization batch, sufficient hydrochloric acid was added to acidify the suspension system to a pH between 4 and 6.

The statistics on the results of these polymerizations are reported in the following table:

TABLE II

| Batch | Parts X | Parts Y | Parts Z | Bulk density, g./cc. | Conversion (percent) |
| --- | --- | --- | --- | --- | --- |
| 2A | 0.05 | 0.04 | 0.02 | 0.40 | 88 |
| 2B | 0.05 | 0.08 | 0.04 | 0.40 | 87.5 |
| 2C | 0.05 | 0.02 | 0.04 | 0.38 | 89 |
| 2D | 0.10 | 0.02 | 0.02 | 0.37 | 89 |
| 2E | 0.10 | 0.04 | 0.04 | 0.34 | 87 |
| 2F | 0.10 | 0.02 | 0.04 | 0.35 | 88 |
| 2G | 0.10 | 0.04 | 0.04 | 0.34 | 87 |
| 2H | 0.10 | 0.02 | 0.04 | 0.35 | 89 |

In Table II the bulk density of the products are given in the column headed "density" in g./cc. and the column headed "conversion" gives the percentage of total vinyl chloride charge that was converted to polymer.

Micorscopic examination of the particles from batches 2A-2H showed smaller particles were formed at higher concentrations of methyl cellulose and lithium hydroxide charged to the polymerization system. All of the batches were tested for heat stability and were found to be more heat stable than a commercially available blotter-type ploymer of bulk density 0.37 g./cc. ("Dow 133–4").

DISCUSSION OF DETAILS

The new methods and polymerization systems of the invention make possible the production of blotter-type vininyl halide resins of improved mixing capabilities with plasticizer. The low and intermediate conversion of polymers produced in accordance with the new methods exhibit good cold and hot, dry blending properties. Tests performed by the so-called "Brabender" blend tests reveal that vinyl halide resins propared by the new suspension polymerization methods give blend times that are 50 to 100% better as compared with previously available blotter-type resins of comparable percentage conversion. This improvement in mixing qualities of the resins is apparently due to the discovery that the use of lithium salt in conjunction with an anionic emulsifier in an aqueous system having a pH between 2 and 6 and used in an amount below a critical micelle formation level creates resins of unique particle size, shape and distribution combined with a desirable low bulk density. Comparable results are not obtained through the use of sodium or potassium salts.

The lithium ion content of the aqueous suspension systems is advantageously controlled between 1 and 20 parts by weight for each 1000 parts of the aqueous system. This can be obtained and measured by controlling the amount of lithium salt contained in the polymerization between 0.01 and 0.12 part per 100 parts by weight of polymerization monomer charged to the polymerization system.

The lithium ion content of the suspension system can be obtained by adding to the aqueous system any water-soluble lithium salt. The salt per se may be added to the system or it may be formed in situ by reaction of another salt, oxide hydroxide or other lithium compound with an acid. A preferred method of providing the lithium content of the suspension system is charging lithium hydroxide to the suspension system and allowing this to react with the acid to adjust the pH of the aqueous system to between 2 and 6. Examples of other lithium compounds which may be successfully used in place of lithium hydroxide include lithium acetate, lithium bromide, lithium chloride, lithium perchlorate, lithium fluoride, lithium formate, lithium hydride and lithium fluorosulfonate.

In obtaining the acidic pH of 2 to 6 for the aqueous suspension medium, any suitable acid, inorganic or organic, may be used. If an organic acid is employed, it may be mont or polycarboxylic and can have hydroxy groups or other substituents which do not adversely affect the polymerization. An organic acid is preferably saturated; but, if it is unsaturated, the acid should not interfere with the polymerization or copolymerize with the vinyl monomer unless such is desired. In the later case, excess acid will be required in order to fill the requirement for copolmerization. The acidic material employed for the pH adjustment must have sufficient acidity to obtain the desired pH. Acid salts of lithium alone de not appear to posses this property and, therefore, are not the equivalent of lithium hydroxide plus acid or a lithium salt plus acid in giving the desired pH. Similarly, weak organic acids such as stearic acid, have virtually no effect on pH and are unsatisfactory for this pH adjustment. Material such as stearic acid, however, may be included in the polymerization systems to improve or modify properties in the resulting blotter-type resins, e.g., extrusion properties.

Examples of acids or acidic materials which may be employed include hydrochloric acid, phosphoric acid, citric acid, sulfamic acid, hydrofluoric acid formic acid, chloroacetic acid and the like.

The new methods and polymerization systems are advantageously used for the production of homopolymers of vinyl chloride; i.e., polyvinyl chloride. However, the polymerization monomers which are polymerized in the newt polymerization systems may include other vinyl halide monomers such as vinyl fluoride, vinyl bromide, vinylidine fluoride, vinylidine chloride or vinylidine bromide. Alternatively, the polymerization monomers may contain up to 15% of other copolymerizable vinyl monomers; e.g., vinyl acetate, acrylonitrile, phenyl vinyl ether and additional monomer components as indicated in U.S. 3,053,-801, the disclosure of which is incorporated herein by reference.

In addition to lithium ions, anionic emulsifier is an essential component of the aqueous suspension systems. Since the polymerizations is of the suspension type as opposed to an emulsion type, the emulsifier is employed in an amount below its critical micelle level. This value can be readily determined by testing various concentrations of an emulsifier with the polymerizable monomer to determine the emulsification threshold. Generally, from about 0.01 to 0.10 part of emulsifier per 100 parts by weight of monomer provides the desired suspension results without danger of emulsification. Alkali metal salts of alkyl sulfate, for example, sodium lauryl sulfate, and alkyl metal salts of alkaryl sulfonates, namely, sodium dodecyl benzene sulfonate, are advantageously used as the anionic emulsifier. Additional equivalent anionic emulsifiers are known to the art and for this purpose reference is made to U.S. 3,042,665.

Advantageously, the aqueous suspension systems also include a water-soluble suspending agent, sometimes referred to as a protective colloid. Cellulosic derivatives appear to be specifically useful in the new polymerization methods for use as the suspending agent. Methyl cellulose is preferred and particularly methyl cellulose having a viscosity between 10 and 400, especially between 15 and 100. The viscosity is expressed in centipoises for a 2% solution of the methyl cellulose in water. Other cellulose derivatives, particularly cellulose ethers such as methyl hydroxy propyl cellulose may be used for this purpose. The amount of such suspending agent may be varied, but is advantageously controlled between 0.03 to 0.30 part of agent for each 100 parts of polymerization monomer charged to the polymerization system.

Various catalysts, initiators, and the like known in the art of polymerization of vinyl halide monomers may be employed to promote or accelerate monomer polymerization in the presence of the suspension systems. A number of materials are known to be useful as catalysts in vinyl halide polymerizations such as the oil-soluble azobis compounds, oil-soluble peroxides such as benzoyl or lauroyl peroxide and the like. These materials, which generally occur in the discontinuous phase of the polymerization systems, when used in advantageous amounts from 0.01 to 5% by weight of the polymerizable monomer, have no effect upon the plasticizer absorption characteristics, particle size, distribution or other comparable properties of the resins produced by the suspension polymerizations.

The new polymerization methods are characterized by a substantial reduction in the amount of very fine particles produced. This in turn reduces to some extent the dusting problems as well as caking or "bridging" which may occur in delivery of resin from hoppers with storage in containers. This can be a serious problem in the handling and conveying of this type of product since such bridging or caking may contribute to the stoppage of the flow of resin particles. The new resins produced by the process may exhibit some internal porosity whether made to high or low conversion levels. In this regard, the new products are not significantly different from those available heretofore. Accordingly, it is surprising that the new resins exhibit critical improvement in their ability to mix with plasticizers either using the so-called cold, dry blending or hot, dry blending.

Another characteristic in which the new resins exhibit improvement as compared with prior known materials is heat stability. A standard of testing this property is to take 2 grams of the raw polymer without plasticizer, pigment, or stabilizer and the polymer as a small disc at 2000 p.s.i. and 177° C. for two minutes. At the end of this test, the pressed discs of resin are visually observed for discoloration and compared with controlled samples. The new resins of this invention showed no appreciable discoloration when tested by this procedure.

In forming plasticized compositions from the new blotter-type resins, any of the known plasticizers and plasticizing techniques can be employed. Dioctyl phthalate is extensively used as a plasticizer. Numerous other plasticizers may be used, e.g., tricresyl phosphate, and the like.

The extent of pores or crevices within resin particles of the blotter-type, which may be filled with plasticizer, can be determined by measuring the irreversible plasticizer take-up (IPTU) of the resin. A more detailed description of this property and its significance may be had by reference to U.S. 3,062,759. The new blotter-type resins of this invention perform well under this test as shown by the foregoing data tables.

Various additives such as stabilizers, antioxidants, antiozonates, and the like known to be useful in compounding or fabrication of vinyl halide resins may be incorporated in small amounts, e.g., 0.1 to 10%, in any suitable fashion. It is contemplated that this can be accomplished by the addition of these added materials to the polymerization systems of this invention or by incorporating the agents subsequent to recovery of the resulting resins, e.g., admixture with plasticizer. Other agents also known in the art as useful in the compounding of vinyl halide resins may be incorporated by mixing or blending with the polymers during the addition of plasticizer or any other suitable stage. Such added materials include fillers, extenders, rubbers and other resins, pigments, fungicides, fire-proofing agents, curing agents and the like.

The blotter-type resins produced by the new methods may be used for any purpose for which this class of material is known to be useful in the plastics art. Because of the mixing characteristics of these resins, they are advantageous in the production of rigid impact resins by mixing with polyester urethane elastomers, styrene-acrylonitrile copolymers, ABS polymers and the like. They are also useful in production of flexible materials by mixing with plasticizers to create sheets, coatings or molded articles, e.g., interiors of refrigerators, arm rests, radio cases, wire coverings, furniture upholstery, shower curtains, decorative wrappings, wall coverings, adhesive tape backings, floor tiles, shoe uppers and other shoe parts, toys, phonograph records and the like.

The embodiments of the invention in which an exclusive property or right is claimed are defined as follows:

1. A process for the production of blotter-type resins of vinyl halide by suspension polymerization of polymerizable monomer comprising predominantly vinyl halide characterized by the aqueous suspension system in which the polymerizable monomer is polymerized containing lithium ions, free radical initiator, a suspension agent and an anionic emulsifier and having a pH of about 2 to 6.

2. A process as claimed in claim 1 wherein the weight ratio of said aqueous suspension system to total vinyl halide in contact with the system is between about 1.25:1 and 4:1 and the polymerization is conducted at a temperature between about 40 to 70° C.

3. A process as claimed in claim 2 wherein the lithium content of said aqueous suspension system is between about 1 and 20 parts by weight of lithium per 1000 parts of said aqueous system.

4. A process as claimed in claim 3 wherein the lithium content is obtained by introducing lithium hydroxide into the aqueous system in an amount between 0.01 to 0.12 part per 100 parts of vinyl halide monomer charged into the suspension system.

5. A process as claimed in claim 1 wherein the weight ratio of anionic emulsifier to vinyl halide monomer charged into the suspension system is between 1:10,000 and 1:1000.

6. A process as claimed in claim 5 wherein the temperature of polymerization is between 44 and 65° C. and the anionic emulsifier is an alkali metal salt of an alkyl sulfate or an alkaryl sulfonate.

7. A process as claimed in claim 1 wherein the aqueous suspension system contains methyl cellulose as a water-soluble suspending agent in an amount from about 0.03 to 0.30 part per 100 parts of polymerizable monomer charged into the suspension system.

8. A process as claimed in claim 1 wherein the polymerization is performed at a temperature between about 40 to 70° C. until about 40 to 70% of the polymerizable monomer charged into the aqueous suspension system is converted to polymer.

No references cited.

JOSEPH L. SCHOFER, Primary Examiner

J. A. DONAHUE, Jr., Assistant Examiner

U.S. Cl. X.R.

260—85.5, 87.1, 87.5, 87.7

PO-1050
(5/69)

UNITED STATES PATENT OFFICE
CERTIFICATE OF CORRECTION

Patent No. 3,523,986      Dated August 11, 1970

Inventor(s) Robert E. Bingham

It is certified that error appears in the above-identified patent and that said Letters Patent are hereby corrected as shown below:

Column 1, line 14, for "bulky" read -- bulk --; line 42, for "so-called polymerizations" read -- so-called emulsion polymerizations --. Column 2, line 35, for "narrow" read -- narrower --; line 37, for "bulky" read -- bulk --. Column 5, line 41, for "ploymer" read -- polymer --; line 45, for "vininyl" read -- vinyl --; line 50, for "propared" read -- prepared --. Column 6, lines 9-10, for "lithium formate, lithium hydride" read -- lithium formate, lithium citrate, lithium hydride --; line 14, for "mont" read -- mono --; line 23, for "de" read -- do --; line 40, for "newt" read -- new --; line 63, for "emulsifier" read -- emulsifiers --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents